United States Patent
Bolan et al.

(10) Patent No.: US 8,123,957 B2
(45) Date of Patent: *Feb. 28, 2012

(54) METHOD AND APPARATUS OF SUBMERSIBLE INTAKE EQUIPMENT

(75) Inventors: Mark Hayes Bolan, Princeton, TX (US); Kenneth Charles Phelps, McKinney, TX (US); Donnie Wayne Alexander, Princeton, TX (US); John Baxter Horton, Jr., Sachse, TX (US); Jeremy Scott Smith, Balch Springs, TX (US); Michael Larry Culbreath, McKinney, TX (US)

(73) Assignee: Incon-Trol Corp., McKinney, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/065,618

(22) Filed: Mar. 26, 2011

(65) Prior Publication Data
US 2011/0174703 A1 Jul. 21, 2011

Related U.S. Application Data

(63) Continuation of application No. 12/317,001, filed on Dec. 19, 2008, now Pat. No. 7,938,957.

(60) Provisional application No. 61/192,310, filed on Sep. 17, 2008.

(51) Int. Cl.
*F04B 53/00* (2006.01)
*B01D 35/05* (2006.01)
(52) U.S. Cl. .................. 210/747.5; 210/747.6; 405/127
(58) Field of Classification Search .................. 210/747, 210/776, 122, 162, 170.05, 170.09, 170.1, 210/170.11, 242.1, 747.5, 747.6; 405/127; 417/61, 423.3
See application file for complete search history.

(56) References Cited

U.S. PATENT DOCUMENTS

| | | | | |
|---|---|---|---|---|
| 3,402,817 A * | 9/1968 | Dovel | ........................ | 210/242.1 |
| 4,154,680 A * | 5/1979 | Sommer | .................... | 210/242.1 |
| 4,492,514 A * | 1/1985 | Dron | ................................ | 415/1 |
| 4,582,609 A * | 4/1986 | Hunter et al. | ................. | 210/747 |
| 5,113,889 A * | 5/1992 | McGuire, Jr. | ................. | 405/127 |
| 5,215,654 A * | 6/1993 | Karterman | ..................... | 210/122 |
| 5,417,553 A * | 5/1995 | Gibson et al. | .............. | 417/423.3 |
| 5,558,462 A * | 9/1996 | O'Haver | .................... | 210/242.1 |
| 5,753,108 A * | 5/1998 | Haynes et al. | ........... | 210/170.05 |
| 5,860,792 A * | 1/1999 | Marks | ........................ | 417/423.3 |
| 6,076,994 A * | 6/2000 | Brockway et al. | ............ | 405/127 |
| 6,183,646 B1 * | 2/2001 | Williams et al. | .............. | 210/199 |
| 6,251,266 B1 * | 6/2001 | Gannon et al. | ................. | 210/122 |
| 6,485,638 B2 * | 11/2002 | Henkin et al. | ............. | 210/242.1 |
| 7,241,384 B1 * | 7/2007 | Torres-Collazo | .......... | 210/242.1 |
| 7,713,031 B2 * | 5/2010 | Dane | ................................ | 417/61 |
| 7,938,957 B2 * | 5/2011 | Bolan et al. | .................... | 210/122 |
| 2010/0054961 A1 * | 3/2010 | Palecek et al. | .................. | 417/61 |

* cited by examiner

*Primary Examiner* — Christopher Upton (57) ABSTRACT

An apparatus having flotation ballasts, a flotation platform and on the flotation platform, an intake equipment, such as a screen, check valve and/or pump intake and a coupling for a discharge pipe. In an embodiment of the present invention comprises, there are a plurality of substantially symmetrical flotation ballasts, each having a ballast chamber. The composition of the flotation ballast may be made of a material having a density appropriate for the fluid in which it is to be submerged. The method includes the steps of using an apparatus as herein described to ascend and descend intake equipment.

15 Claims, 8 Drawing Sheets

METHOD AND APPARATUS OF SUBMERSIBLE INTAKE EQUIPMENT

CROSS REFERENCE TO RELATED APPLICATIONS

This application claims the benefit of U.S. Provisional Application No. 61/192,310, filed on Sep. 17, 2008, entitled "METHOD AND APPARATUS OF SUBMERSIBLE INTAKE EQUIPMENT" and is a Continuation of U.S. Regular application Ser. No. 12/317,001 filed Dec. 19, 2008, entitled METHOD AND APPARATUS OF SUBMERSIBLE INTAKE EQUIPMENT now U.S. Pat. No. 7,938,957.

TECHNICAL FIELD

The present invention relates to submersible intake equipment, such as valves, screens and pumps used in fluids, for example, but not limited to, those used in a water source for water transfer and recirculation projects or in sewage in a sewer filtration station.

BACKGROUND OF THE INVENTION

There are a variety of valves, screens and pumps, such as foot valves, check valves and turbine pumps (referred to herein collectively, or individually as an "intake" or "intake equipment"), used in, for example, a water source in water transfer and recirculation projects or in sewage in a sewer filtration station. Such conventional apparatus typically include a discharge pipe coupled to such intake equipment, such as made from a multi-ply material with, e.g., coil reinforcement. Such a discharge pipe has a proximate end that terminates on shore and a distal end that terminates at the intake equipment. The ends of the discharge pipe include, e.g., flanges which mate with the intake equipment at the distal end and e.g., pump equipment or exhaust ports located at a shoreline. As used throughout this application, the term discharge pipe shall mean the discharge pipe or hose and all associated plumbing and couplings directly or indirectly coupled thereto, such as flanges, flex pipe sections, HDPE pipe sections, PVC pipe sections and the like. Typically, such discharge pipes are maintained above the water source floor or bottom using e.g., floats which float on the surface of the water and to which the discharge pipe is tethered. In this manner, valves/pumps can be serviced by allowing a technician to pull the discharge pipe and intake equipment to shore. However, such floats, which are partially located above the water line, are a visual nuisance and also have additional installation and maintenance requirements. This is a disadvantage when, for example, the water source is part of a landscaping project. Because of this, it is often the case that the use of floats is avoided by laying the intake equipment and discharge pipe directly on the bottom of the water source. However, this makes it very difficult to pull the discharge pipe and intake equipment to shore. As a result, the discharge pipe and intake equipment must either be serviced in place, using a diver, or the discharge pipe and intake equipment must be pulled to the surface using a crane or similar machinery. This can be very expensive, especially relative to the cost of the intake equipment, e.g., valve, that is to be serviced.

Pumping equipment and apparatus are described in two different design categories, flooded suction or suction lift. With flooded suction, the centerline of the pump volute is below the source, e.g., water, that is to be pumped. With suction lift, the centerline of the pump volute is above the source, e.g., water, to be pumped. A typical suction lift application requires standard equipment, suction screen, foot valve and suction plumbing plumbed backed to the center line of the pump volute or suction inlet of pump(s), using, e.g., a discharge pipe. This equipment is typically installed under one of two conditions. The first is when the water storage area is full, thus hindering access for installation. In such case, it can be cost prohibitive to drain the body of water to install the apparatus, thus requiring a crane or a floating work platform to perform the installation. To compound the problem, it is often difficult to see the orientation of the suction screen during installation due to, inter alia, low water visibility. As a result an improper installation may occur without the knowledge of the installer. To avoid this, a scuba diver must be used to observe or feel the apparatus on the bottom of the body of water and insure a proper installation.

The same consideration applies with respect to the service or removal of the intake equipment. That is, depending on the weight of the apparatus, heavy equipment and/or draining of the body of water may be required. The cost of draining the body of water depends on the storage capacity. Further, if the apparatus provides irrigation needs for plants and landscaping, additional costs may be incurred if the body of water is drained as such plants and landscaping may become stressed or die before the system is back on-line.

What is desired is a method and apparatus that allows installation of and access to intake equipment in a cost effective manner. The present invention provides such a method and apparatus.

SUMMARY OF THE INVENTION

The use of a singular term herein shall also refer to the plural and vice versa. For example, intake equipment not only refers to a single valve, screen and/or pump on a flotation platform, but shall also be construed to refer to multiple valves, screens and/or pumps on a flotation platform. Further, the use of terms such as "front", "rear", "top", "bottom," "left," "right" and the like are not meant to be limiting, but rather are to describe the location of the various elements and components of the present invention with respect to one another as seen in the Figures.

The present invention provides a number of advantages over the conventional apparatus and methods. The present invention includes a flotation platform and system to allow the controlled descent and ascent of intake equipment, e.g., valve, screen and/or pump, at the distal end of a discharge pipe. In operation, the present invention facilitates the proper installation of the apparatus without the need for a diver. This further permits the ascension of the apparatus to the water surface without the use of heavy equipment. In this manner, the apparatus can be floated to the water surface for maintenance and visual inspection. Alternatively, the apparatus can be floated and then pulled to the shore and/or pushed back in place without the need for heavy equipment. Further, all of the installation, inspection, maintenance and replacement tasks can be undertaken without draining a body of water.

To those skilled in the art to which this invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

For a better understanding of the present invention including the features, advantages and specific embodiments, reference is made to the following detailed description along with accompanying drawings in which.

References in the detailed description correspond to like references in the Figures unless otherwise noted. Like numerals refer to like parts throughout the various Figures.

DETAILED DESCRIPTION OF THE PREFERRED EMBODIMENTS

While the making and using of the preferred embodiments of the present invention are discussed in detail below, it should be appreciated that the present invention provides many applicable inventive concepts which can be embodied in a wide variety of specific contexts. Some features of the preferred embodiments shown and discussed may be simplified or exaggerated for illustrating the principles of the invention. The present invention is described with reference to its use in water, however, the present invention is not limited to use in water as it can be similarly deployed in any fluid in which an intake is required, including, but not limited to sewage and other liquids and semi-liquids.

The apparatus of the present invention is adapted to permit the controlled descent and ascent of flotation platform having thereon an intake equipment, e.g., valve, screen and/or pump intake, at the distal end of a discharge pipe. The apparatus of the present invention comprises a flotation platform having a plurality of substantially symmetrical flotation ballasts, each having a ballast chamber as described herein. The composition of the flotation ballast may be made of a material having a density appropriate for the fluid in which it is to be submerged. Such composition includes, but is not limited to, PVC, CPVC, aluminum, stainless steel, fiberglass, HDPE, and painted steel.

Further, as seen in the Figures, each flotation ballast is preferably a substantially hollow cylinder having an end cap on each end of the cylinder, thus forming a ballast chamber. The end caps are preferably coupled to the cylinder forming a seal between the outside thereof and the ballast chamber. In the preferred embodiments, there are two flotation ballasts arranged in a substantially parallel manner with the flotation platform positioned therein-between. Each of the plurality of flotation ballasts have at least one flotation ballast intake inlet adapted to receive or release, in a controlled manner, a compressed gas, such as air, via flotation ballast air lines, into or out of its respective flotation ballast so as to increase or decrease, respectively, the buoyancy thereof.

In operation, the present invention can be located near a shore line, with the flotation ballasts on the water. An air-water boundary is formed at apertures (as described below) between the water surface and the hollow interior of the flotation ballast when compressed gas, such as air, is injected in each ballast chamber. The compressed gas is injected into each such ballast chamber via an air intake valve on each of the air lines, each such valve preferably located at the proximate end thereof at shore. The apparatus of the present invention is then moved along the water surface to an area where it is to be submerged. When the apparatus of the present invention is located in the area in which it is to be submerged, the air intake valve on each of the air lines is opened to release the compressed gas. In place of the compressed air, a ballast, e.g., water, is introduced into the ballast chamber via the apertures (referred to herein as "port holes") at the bottom of each flotation ballast. In this manner, by decreasing the buoyancy of the flotation ballasts, the flotation platform is lowered in the fluid, e.g., water. Reversing the process, in place of the ballast e.g., water, compressed air is introduced into the ballast chamber via the air intake valves on each of the air lines. In this manner, by increasing the buoyancy of the flotation ballasts, the flotation platform is raised in the fluid, e.g., water. Although the term "air" is used herein with respect to the air lines and air intakes, the present invention is not limited to the use of air in the lines and in the flotation ballasts, as any suitable gas can be injected via the air lines and air intake into the flotation ballasts. Further, suitable filters can be placed in series in the lines and intakes so as to filter impurities from the various components of the present invention.

As noted above, the distal end of each flotation ballast air line is coupled at a respective flotation ballast intake inlet and the proximate end of each respective air line is coupled, via a valve or other control means, to a compressed gas source, such as, but not limited to a compressed air generator. The compressed gas is injected into each flotation ballast at the same rate, or at varying rates as describe herein. In this manner, the buoyancy of each flotation ballast can be matched to the amount of weight incident thereon so as to permit the plane of the flotation platform to be raised or lowered parallel to the surface of the water. The means of varying the rate of injection or release of the compressed gas can include having a separate valve feeding each flotation ballast air line. When the air line valves are opened, compressed gas is displaced from the ballast chamber by fluid, e.g., water is allowed to enter therein through the port holes, thus allowing the apparatus to descend. When the apparatus is resting on the floor of the fluid, it is raised by injecting compressed gas, such as air, through the valves, air lines and intake inlet on the flotation ballast into the flotation chamber thereof. The compressed gas expels the ballast, e.g., water, through the port holes. An ancillary benefit of this operation of the present invention is that the expelling force of the ballast is imparted to silt and sediment surrounding the apparatus, thus helping free the device from the floor of the water source.

The system of the present invention includes the apparatus described above (the flotation ballast, flotation platform and associated intake components, such as, but not limited to, screens, valves and/or pumps), discharge pipe and related plumbing, flotation ballast air lines and associated valves and regulators, and associated shoreline equipment, such as but not limited to, compressed air generator.

The method of the present invention includes the steps of installing, placing and using the apparatus described above (the flotation ballast, flotation platform and associated intake components, such as, but not limited to, screens, valves and/or pumps), discharge pipe, flotation ballast air lines, and associated shoreline equipment, such as but not limited to, compressed air generator. Such steps include, placing a flotation ballast on a flotation platform, placing intake equipment on or about the flotation platform, providing at least one valve to an air line coupled to each flotation ballast, and receiving or releasing compressed gas into each flotation ballast so as to displace or increase a ballast thus increasing or decreasing the buoyancy of the flotation ballast.

Related methods covered hereunder include a method of installing intake equipment, a method of servicing intake equipment and a method of replacing intake equipment. The method of installing intake equipment includes the step of positioning the intake equipment on a flotation platform having flotation ballast and releasing compressed gas from the flotation ballast on which intake equipment is positioned so as to fill a ballast chamber with a ballast and thus decrease the buoyancy of the flotation ballast. The method of servicing intake equipment includes the step of receiving compressed gas into at least one flotation ballast on which intake equipment is positioned so as to increase the buoyancy of the flotation ballast. Such other related methods include the steps of receiving or releasing compressed gas into or out of a flotation ballast on which an intake equipment is positioned so as to increase or decrease buoyancy of the flotation ballast by ejecting or introducing a ballast into a ballast chamber.

With the use of the flotation ballast system of the present invention, the apparatus of the present invention can be easily positioned on the shore of a body of water. At this location, plumbing and air lines can be connected to the apparatus. In an alternative embodiment, the couplings required in the field, e.g., to the intake components and the air lines, are on the top of the apparatus making it easier to attach said components and air lines without having to perform any tasks under, e.g., the water. Once the plumbing and air lines are coupled, the apparatus of the present invention is positioned in the area where the descent is to occur. A lead guy is attached to the apparatus of the present invention to prevent lateral movement thereof. Air lines are coupled to the flotation ballasts, via inlets, on the top of the apparatus. Port holes in the bottom of the flotation ballasts of the apparatus of the present invention allow water to enter into the ballast chambers, decreasing the buoyancy of the apparatus, when air is released via valves located at the proximate end, e.g., at the shore line, of the air lines.

As noted herein, the air lines to the flotation ballasts include in line valves so as to allow for individual control of the different ballast which controls the angle of descent. In order to cause the apparatus of the present invention to ascend, a low volume, low pressure air compressor is coupled to the air lines. In operation, the air compressor forces compressed air into the ballast chamber forcing water therefrom through the port holes in the bottom of the ballast chambers. Once the water has been displaced with air the apparatus becomes buoyant and floats to the surface.

Figure 1:
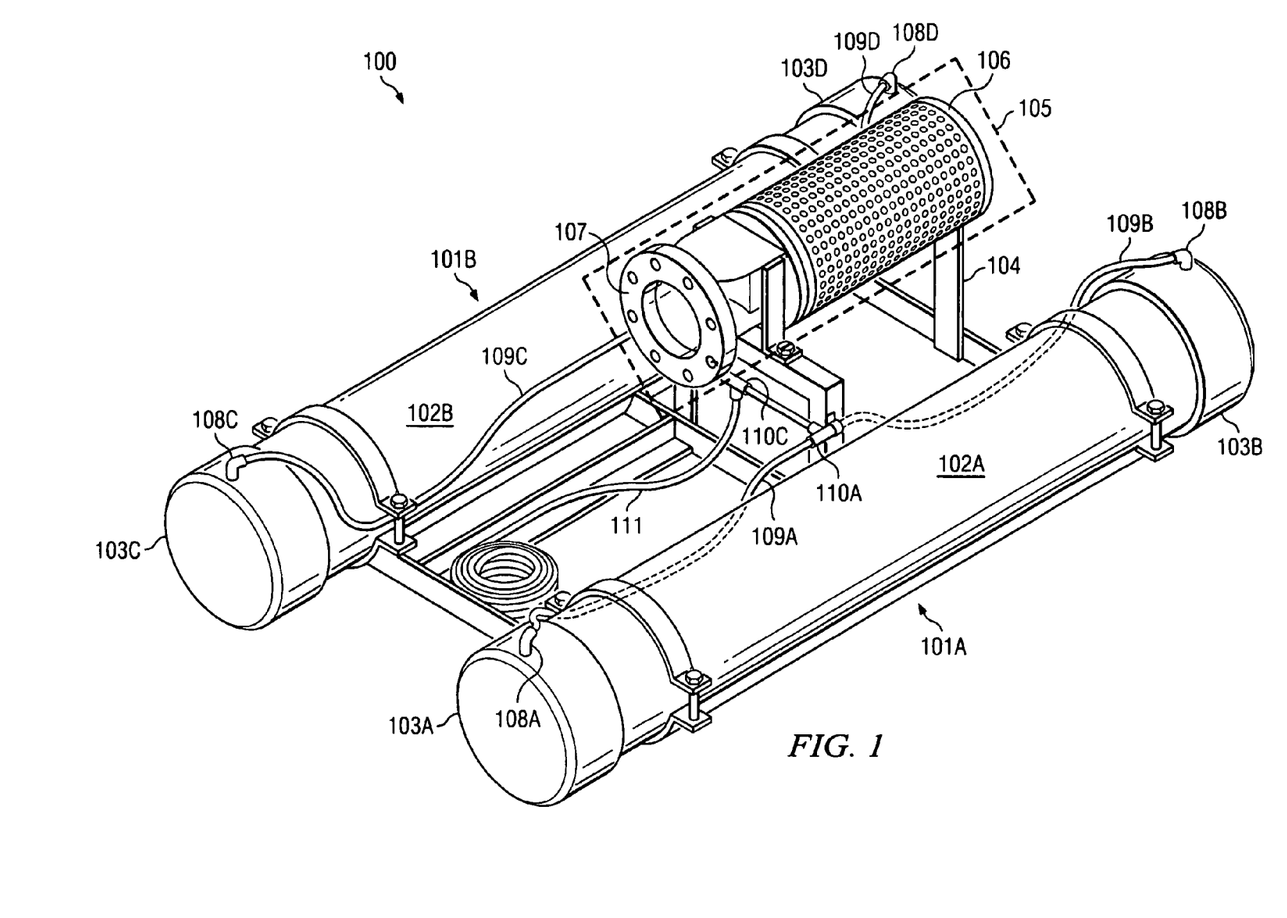
FIG. 1 is a right side perspective view of a first embodiment of the present invention.

Referring now to the Figures, FIG. 1 is a right side perspective view of a first embodiment 100 of the present invention. As seen therein, a plurality of substantially symmetrical flotation ballasts 101A, 101B, each having a ballast chamber, are located on flotation platform 104. The composition of the flotation ballasts 101A, 101B are of a material having a density appropriate for the fluid in which it is to be submerged. Such composition includes, but is not limited to, PVC, CPVC, aluminum, stainless steel, fiberglass, HDPE, and painted steel. Each flotation ballast is preferably a substantially hollow cylinder 102A, 102B having an end cap 103A, 103B, 103C, 103D on each end of the cylinder, thus forming a ballast chamber. The end caps 103A, 103B, 103C, 103D are preferably coupled to the cylinders 102A, 102B forming a water proof and air tight seal between the outside thereof and the ballast chamber. The two flotation ballasts 101A, 101B are arranged in a substantially parallel manner with the flotation platform 104 positioned therein-between. The flotation platform 104 can be assembled in any suitable manner such that it supports each of the flotation ballasts 101A, 101B and intake equipment 105. For example, flotation platform 104 can be assembled from aluminum, stainless steel, painted steel or the like metal angle, metal flat bar and/or metal tubing. Such pieces can be assembled and coupled using welded joints and/or nuts and bolts.

The intake equipment 105 of the first embodiment of the present invention comprises at least a screen 106 and flange 107 to which is coupled a discharge pipe. The screen as seen in FIG. 1 is a horizontally positioned (with respect to the apparatus) cylinder having apertures in the walls thereof and a closed end and an open end leading into a discharge pipe. The apertures in the screen are sized so as to filter material having a predetermined size from entering the discharge pipe. The intake equipment 105 is seen coupled to the flotation platform 104. A discharge pipe is not see in FIG. 1.

Each of the flotation ballasts 101A, 101B have at least one flotation ballast intake inlet 108A, 108B, 108C, 108D (not shown) adapted to receive or release, in a controlled manner, a compressed gas, such as air, via flotation ballast air lines 109A, 109B, 109C, 109D (not shown) into or out of its respective flotation ballast so as to increase or decrease, respectively, the buoyancy thereof. The air lines 109A, 109B, 109C, 109D are coupled to the distal end of air line 111 via combiners 110A, 110B (not shown), 110C thus permitting a single air line to be run to the shore line to be coupled to a gas compressor at its proximate end.

Figure 2:
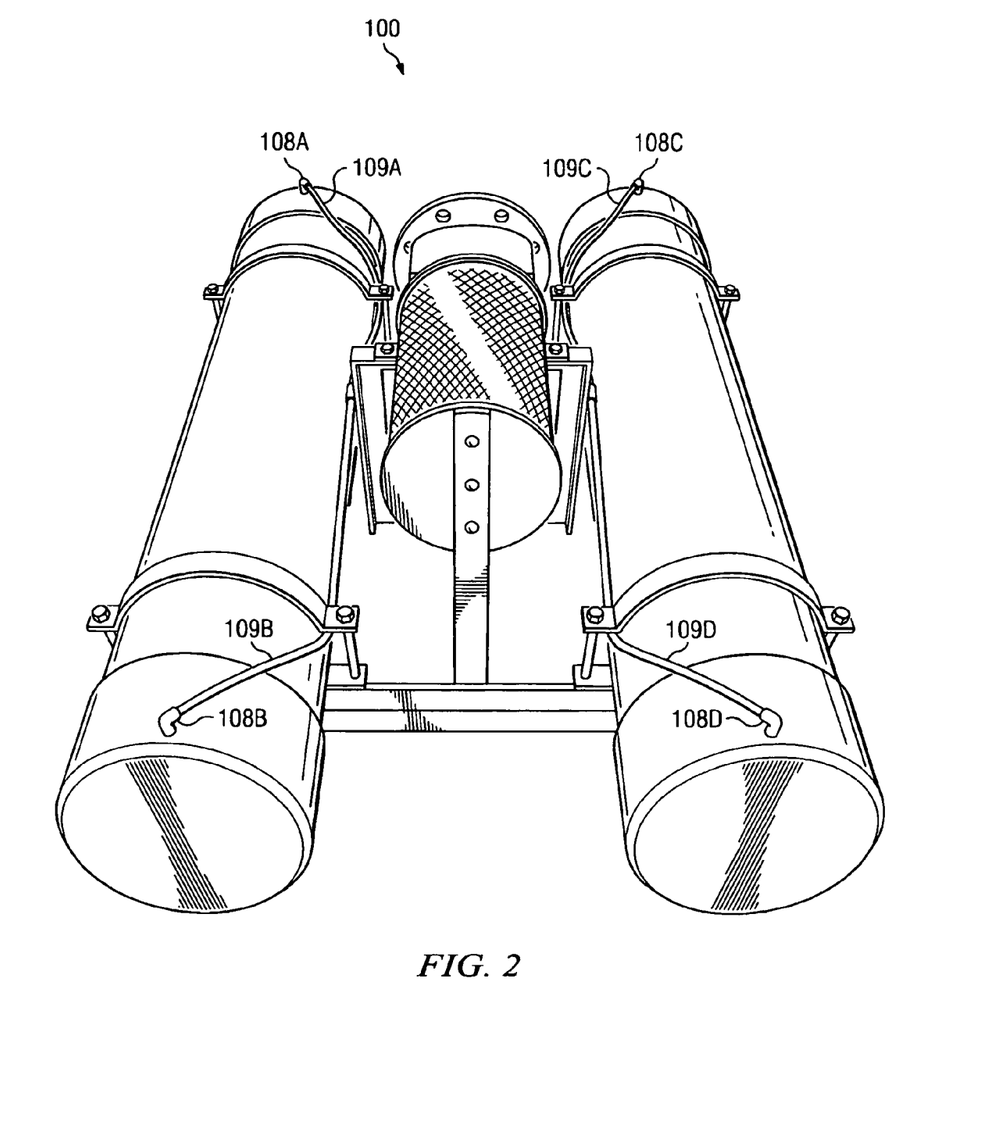
FIG. 2 is a front perspective view of a first embodiment of the present invention.
Figure 3:
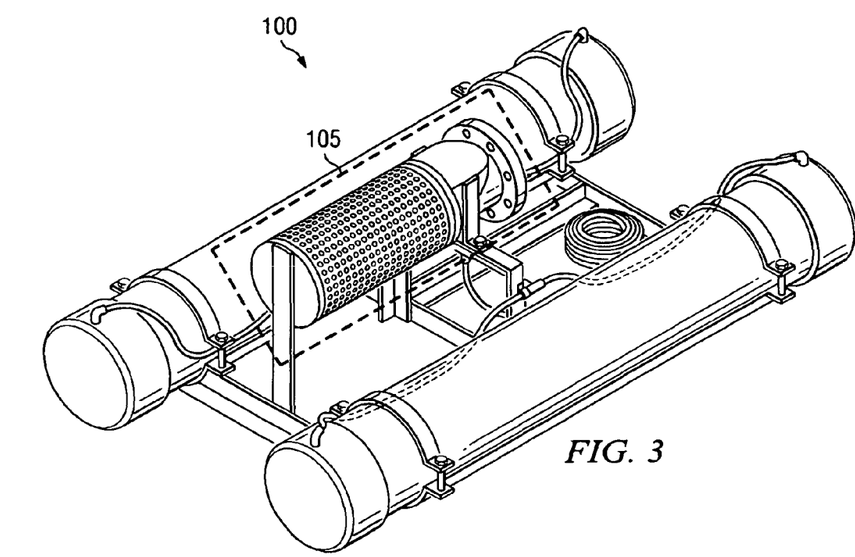
FIG. 3 is a left perspective view of a first embodiment of the present invention.
Figure 4:
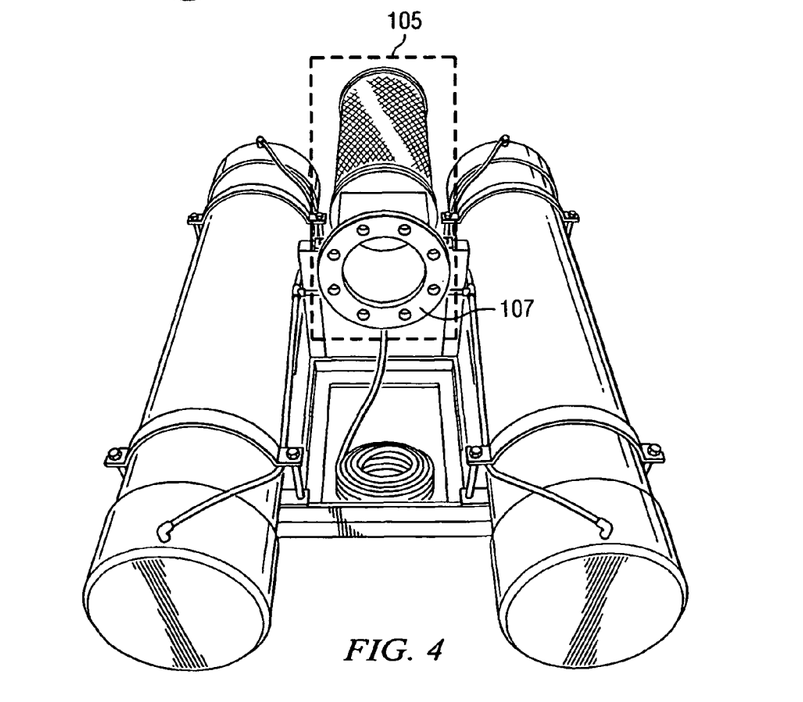
FIG. 4 is a rear perspective view of a first embodiment of the present invention.

FIG. 2 is a front perspective view of a first embodiment 100 of the present invention better illustrating the flotation ballast intake inlet 108A, 108B, 108C, 108D and flotation ballast air lines 109A, 109B, 109C, 109D. FIG. 3 is a left perspective view of a first embodiment 100 of the present invention better illustrating intake equipment 105. FIG. 4 is a rear perspective view of a first embodiment of the present invention, better illustrating the flange 107 of the intake equipment 105 to which a discharge pipe (not shown) can be coupled.

Figures 5, 7:
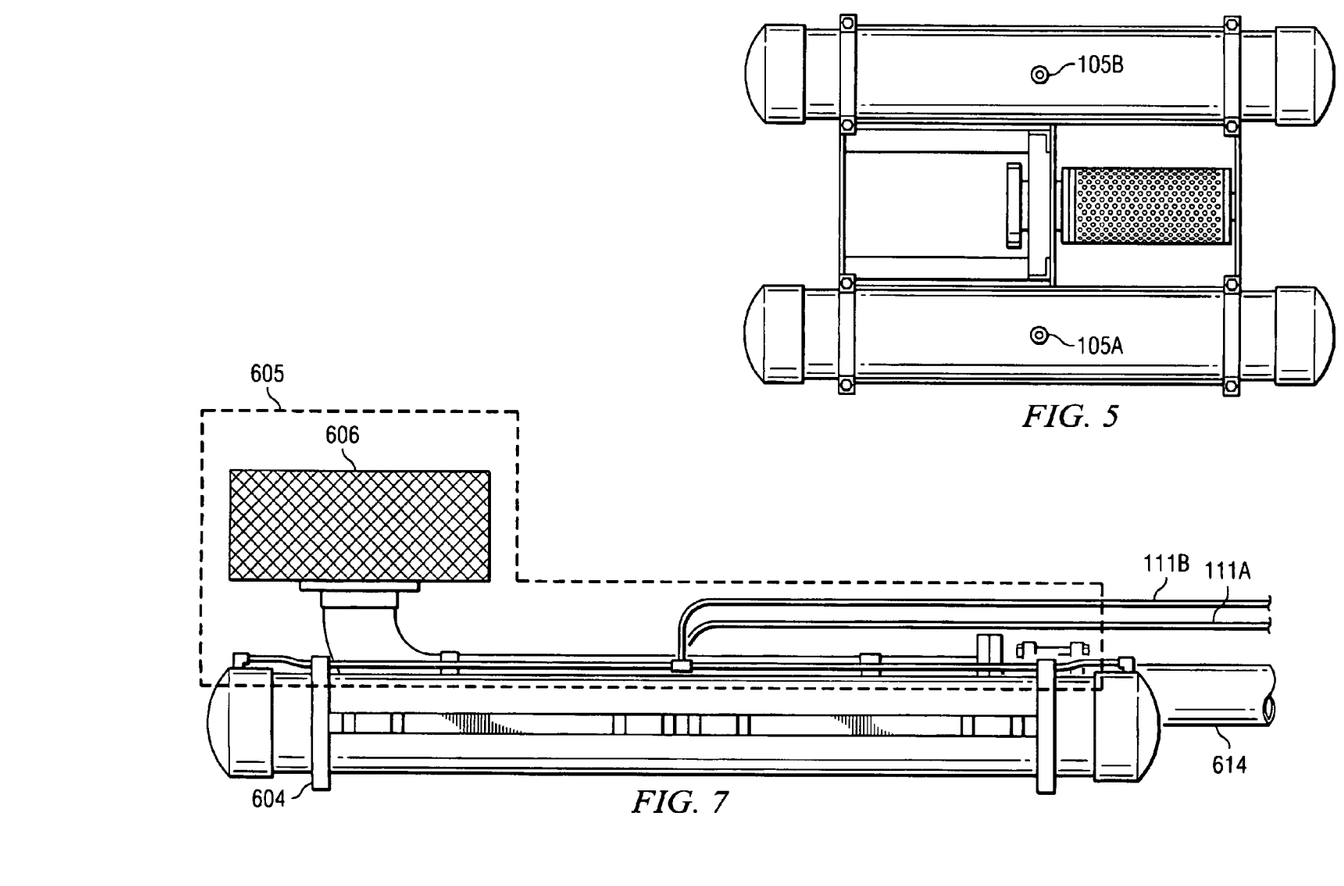
FIG. 5 is a bottom view of a first embodiment of the present invention.
FIG. 7 is a left side view of a second embodiment of the present invention.
Figure 6:
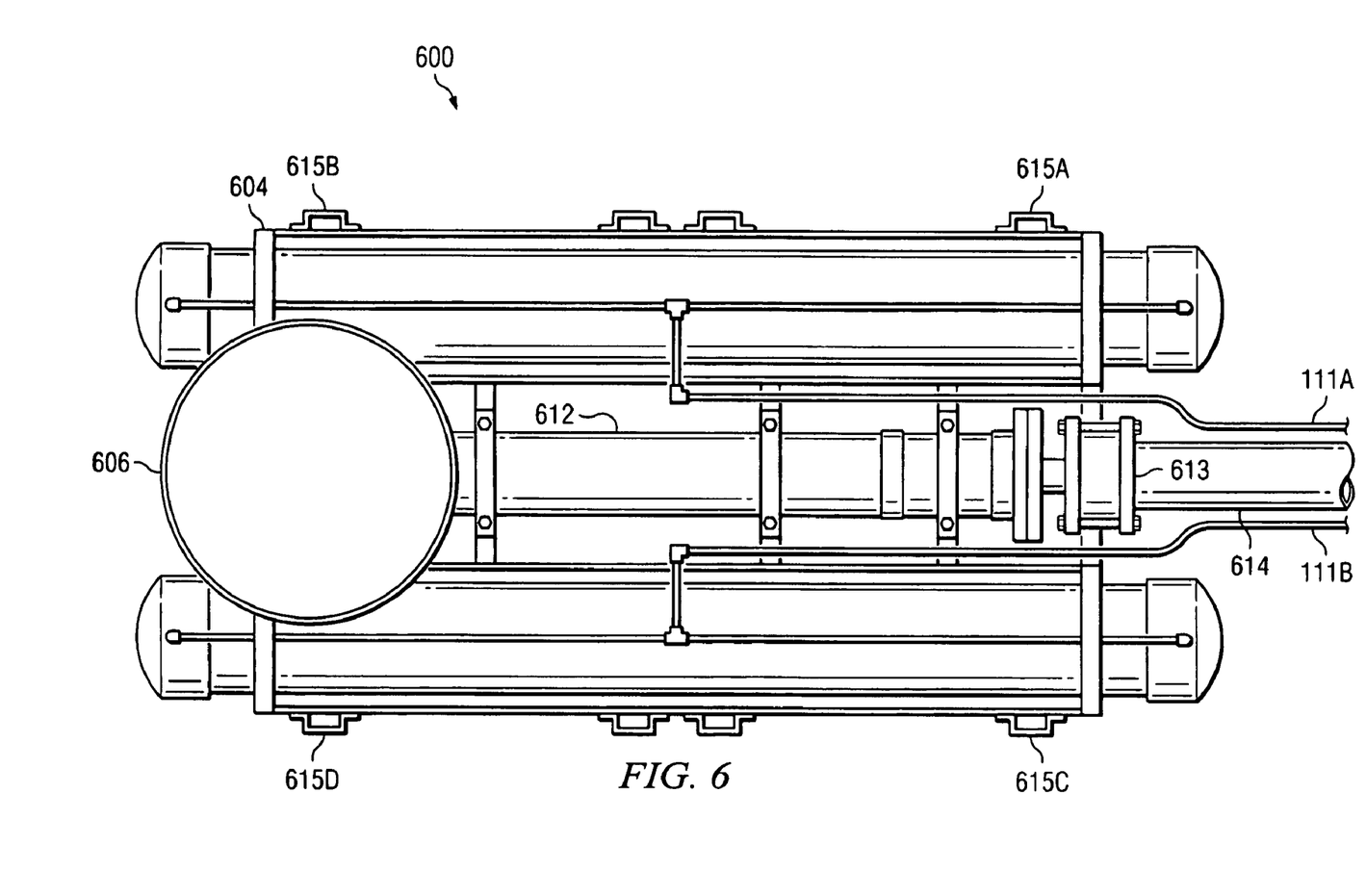
FIG. 6 is a top view of a second embodiment of the present invention.

FIG. 5 is a bottom view of a first embodiment of the present invention. Port holes 501A, 501B are seen on the bottom of flotation ballasts 101A, 101B. In operation, the present invention is placed on a water surface. The flotation ballasts have therein air or other compressed gas that is prevented from leaking or escaping therefrom as air lines 109A, 109B, 109C, 109D, have an air tight connection to air line 111 via combiners 110A, 110B, 110C, which air line is coupled to an air intake valve at the proximate end of the air line which is in a closed position. The placement of the present invention on water as hereinbefore described creates a water-air boundary between the water and the compressed gas, such as air within the flotation ballasts 101A, 101B. When the present invention is located in the area in which it is to be submerged, an air intake valve (not shown) at the proximate end of air line 111 is opened, thus causing the gas, such as air, in the flotation ballast 101A, 101B to escape. In place of the escaping gas, such as air, a ballast, e.g., water, is introduced into the ballast chamber via the port holes 501A, 501B. In this manner, the buoyancy of the flotation ballasts 101A, 101B is decreased and the flotation platform 104 is lowered in the fluid, e.g., water. Reversing the process, in place of the ballast e.g., water, compressed air is introduced into the ballast chamber of flotation ballasts 101A, 101B via flotation ballast intake inlets 108A, 108B, 108C, 108D to which flotation ballast air lines 109A, 109B, 109C, 109D, combiners 110A, 110B, 110C, air line 111 and gas or air source such as a compressor (not shown) are coupled. In this manner, by increasing the buoyancy of the flotation ballasts 101A, 101B, the present invention is raised in the fluid, e.g., water FIG. 6 is a top view of a second embodiment 600 of the present invention. The flotation ballasts of the second embodiment of the present invention are substantially similar to those seen in FIGS. 1-5. The second embodiment includes, as part of the intake equipment 605 mounted on the flotation platform 604, suction screen 606 in a vertical orientation, coupled to submersible pump 612 coupled to check valve 613 which is coupled to discharge pipe 614. The screen as seen in FIG. 6 is a vertically positioned (with respect to the apparatus) cylinder having apertures in the walls thereof and a closed top end and an open bottom end coupled to a curved portion leading into a discharge pipe. The apertures in the screen are sized so as to filter material having a predetermined size from entering the submersible pump. Further coupled to flotation platform 604 are support brackets with mechanical lift points 615A, 615B, 615C, 615D. As distinguished from the first embodiment of the present invention, air lines 111A, 111B are separated to allow differential injection of compressed gas into the flotation ballasts.

Figure 8:
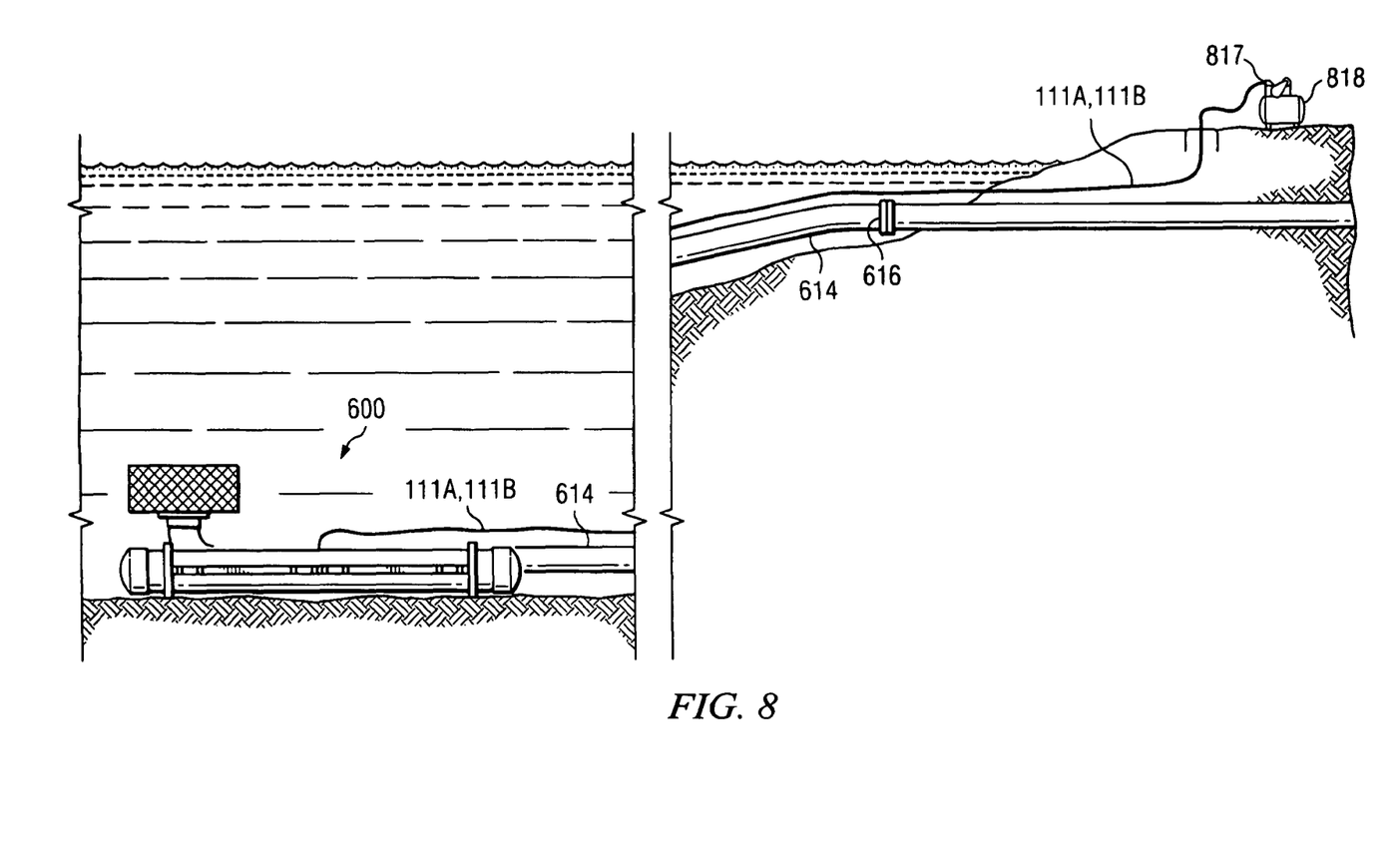
FIG. 8 is a left side view of a second embodiment of the present invention with a discharge pipe to the shoreline.

FIG. 7 is a left side view of a second embodiment 600 of the present invention better illustrating the profile of suction screen 606 in a vertical position (perpendicular to the plane of the flotation platform) as coupled to the flotation platform 604. FIG. 8 is a left side view of a second embodiment 600 of the present invention as coupled to discharge pipe 614. As seen therein, a proximate end discharge pipe coupling 616 facilitates the disconnection of the discharge point near to the shoreline for maintenance and repair. At the proximate end of the air lines 111A, 11B is a ballast adjustment valve assembly 817 coupled to compressed air generator 818 allowing for the injection or release of compressed gas via the air line 111A, 111B to the flotation ballasts.

Figure 9:
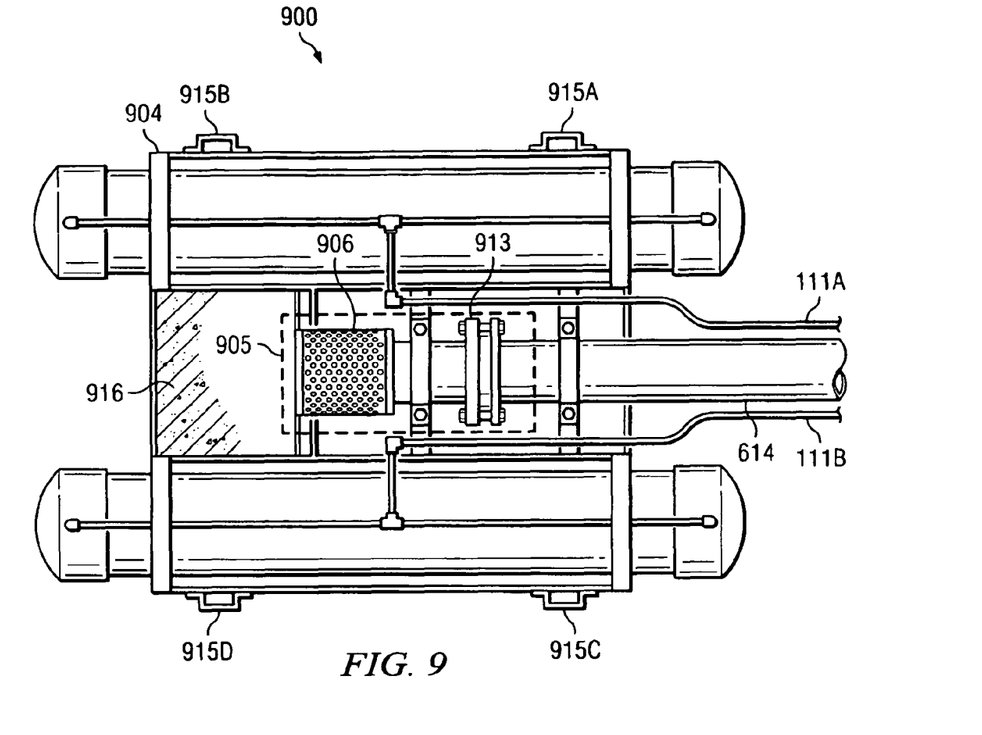
FIG. 9 is a top view of a third embodiment of the present invention.

FIG. 9 is a top view of a third embodiment 900 of the present invention. The flotation ballasts and air lines of the third embodiment of the present invention are substantially similar to those seen in FIGS. 1-5. The third embodiment includes, as part of the intake equipment 905 mounted on the flotation platform 904, suction screen 906 in a horizontal position (parallel to the plane of the flotation platform), coupled to foot valve 913 which is coupled to discharge pipe 614. Further coupled to flotation platform 904 are support brackets with mechanical lift points 915A, 915B, 915C, 915D. As seen therein, concrete blocks 916 add additional ballast to the apparatus as the third embodiment does not include on the flotation platform 904 a submersible pump.

Figure 10:
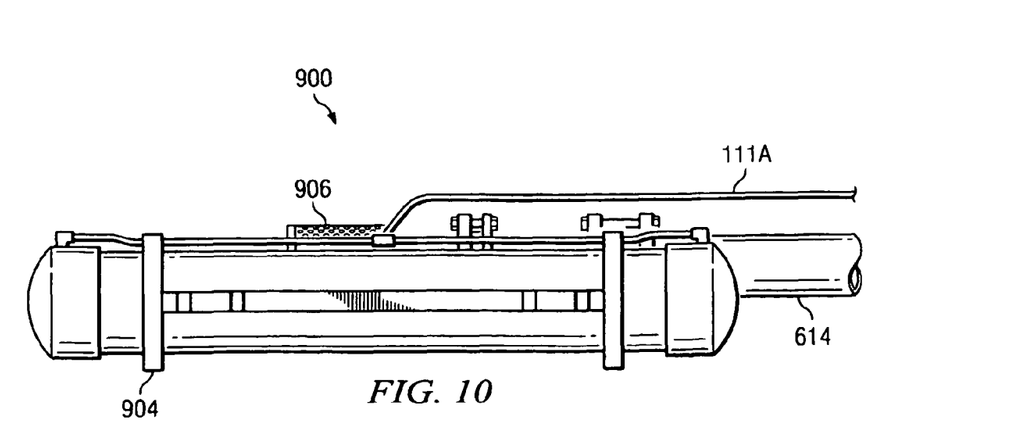
FIG. 10 is a left side view of a third embodiment of the present invention.
Figure 11:
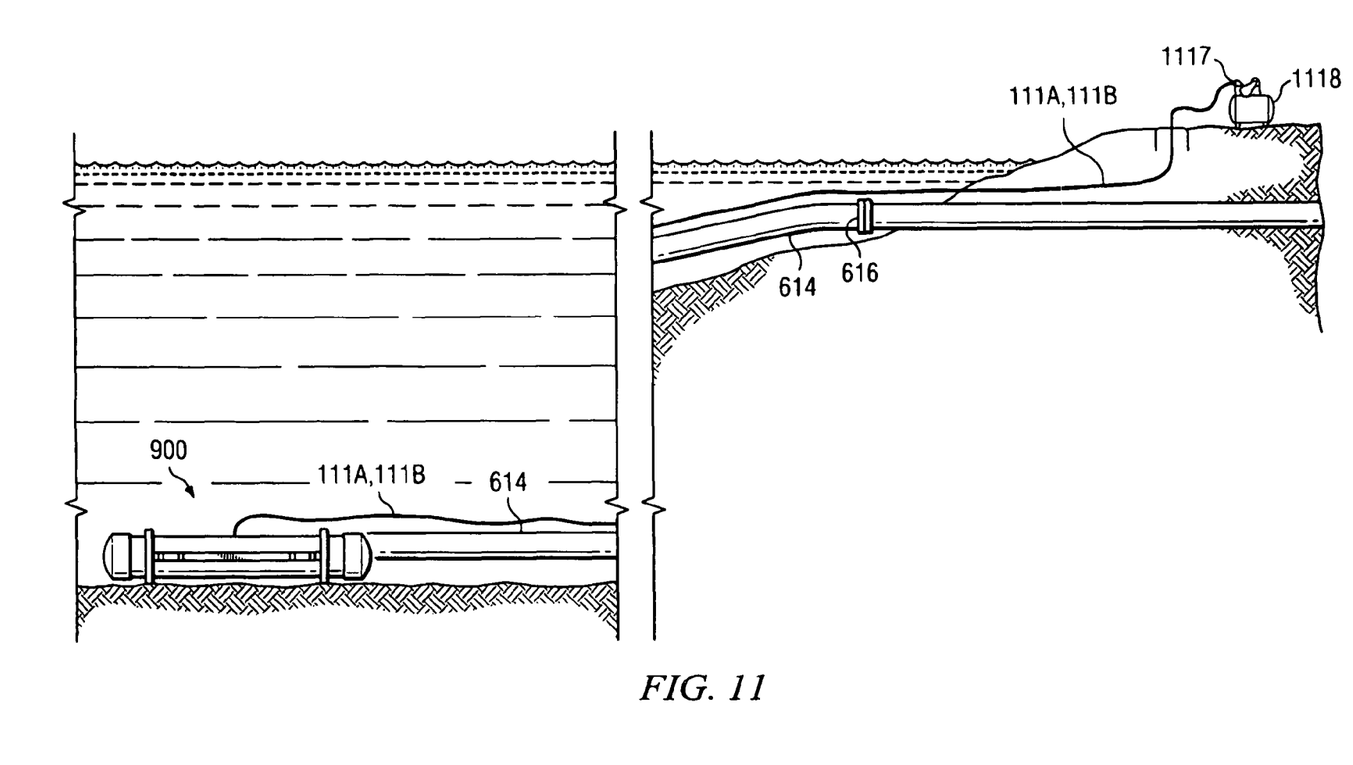
FIG. 11 is a left side view of a third embodiment of the present invention with a discharge pipe to the shoreline.

FIG. 10 is a left side view of a third embodiment 900 of the present invention illustrating suction screen 906, discharge pipe 614 and air line 111A. FIG. 11 is a left side view of a third embodiment 900 of the present invention as coupled to discharge pipe 614. As seen therein, a proximate end discharge pipe coupling 616 facilitates the disconnection of the discharge point near to the shoreline for maintenance and repair. At the proximate end of the air lines 111A, 11B is a ballast adjustment valve assembly 1117 coupled to compressed air generator 1118 allowing for the injection or release of compressed gas via the air line 111A, 111B to the flotation ballasts.

There are a variety of advantages of the present invention. The present invention allows for the proper installation of intake equipment, such as screens, valves and/or pumps without the need for a diver. This further permits the ascension of the apparatus to the water surface without the need for heavy equipment, such as a crane. In this manner, the apparatus of the present invention can be floated to the water surface for maintenance and visual inspection substantially in place, albeit, at the water surface. Alternatively, the apparatus can be pulled to the shore and/or pushed back in place with out the need for heavy equipment. In any such case, all of the tasks of installation, inspection, maintenance and replacement can be made without draining the body of water in which the apparatus is located.

The embodiments shown and described above are only exemplary. Even though numerous characteristics and advantages of the present invention have been set forth in the foregoing description together with details of the method of the invention, the disclosure is illustrative only and changes may be made within the principles of the invention to the full extent indicated by the broad general meaning of the terms used in the attached claims.

What is claimed is:

1. A method of submerging and surfacing an apparatus having intake equipment in a body of fluid, comprising the steps of:
   providing two flotation ballasts, arranged parallel with respect to each other and in a same horizontal plane, each having a ballast chamber, each of the two flotation ballasts further comprising a cylinder having an end cap on each end of the cylinder, thus forming the ballast chamber;
   coupling a flotation platform to the two flotation ballasts;
   coupling intake equipment to the flotation platform between the two flotation ballasts in essentially the same horizontal plane;
   coupling at least one primary air line to the flotation ballasts, the distal end being coupled via at least one combiner to a plurality of subsidiary air lines at the apparatus, each respective subsidiary line being coupled to at least one inlet at each of the two flotation ballasts;
   operating the at least one primary air line and subsidiary air lines as a conduit for the injection of a compressed gas into each ballast chamber of the two flotation ballasts;
   displacing a fluid ballast there-from;
   providing for an aperture on the bottom of each of the two flotation ballasts, the aperture operable to allow the ingress and egress of a fluid ballast into and out of the ballast chamber, the arrangement of the two flotation ballasts with respect to each other being such that, when placed on the surface of a body of fluid and prior to having fluid introduced into the respective ballast chambers, the center axis of each of the two flotation ballasts are parallel to each other, and the plane in which the center axes lie is substantially parallel to the surface of the body of fluid with the aperture respective apertures submerged.

2. The method of claim 1, further comprising the step of coupling a compressed air source to a proximate end of the at least one air line.

3. The method of claim 1, wherein the intake equipment comprises at least one from the group consisting of a screen, check valve and submersible pump.

4. The method of claim 3, wherein the intake equipment includes a vertically positioned screen.

5. The method of claim 3, wherein the intake equipment includes a horizontally positioned screen.

6. The method of claim 1, further comprising the step of coupling each of the two flotation ballasts via two air inlets to a subsidiary air line which is coupled to the primary air line.

7. The method of claim 1, wherein the intake equipment comprises:
a screen;
a check valve having a first end and a second end opposite the first open end,
the first end coupled to the screen; and
a discharge pipe having a distal end and proximate end, the distal end of the discharge pipe being coupled to the second end of the check valve.

8. The method of claim 7, further comprising the step of coupling a pump to the proximate end of the discharge pipe.

9. The method of claim 8, further comprising the step of coupling a source of compressed gas to the proximate end of each respective the primary air line.

10. The method of claim 1, wherein the intake equipment comprises:
a screen;
a submersible pump having a first open end and second open end opposite to the first open end, the first open end coupled to the screen so as to filter material having a predetermined size from entering the submersible pump;
a check valve having a first open end and second open end opposite thereto, the first open end of the check valve being coupled to the second open end of the submersible pump; and
a discharge pipe having a proximate end and distal end, the proximate end being coupled to the second open end of the check valve.

11. The method of claim 10, further comprising the step of coupling a source of compressed gas to the proximate end of the primary air line.

12. A method of submerging and surfacing intake equipment in a body of fluid, comprising the steps of providing two flotation ballasts each comprising a cylinder having an end cap on each end of each cylinder, thus forming a respective ballast chamber, the end caps coupled to the cylinders forming a substantially water proof and air tight seal between the outside thereof and each ballast chamber
arranging the two flotation ballasts in a substantially parallel manner in a same horizontal plane, each flotation ballast having a respective air line inlet coupled to an air line at a distal end thereof;
coupling a flotation platform to the two flotation ballasts, the two flotation ballasts being arranged such that, when placed on a surface of a body of liquid and prior to having liquid introduced into the respective ballast chambers, the center axis of each of the two flotation ballasts is substantially parallel to the surface of the body of liquid;
coupling intake equipment to the flotation platform between the flotation ballasts;
injecting a source of compressed gas into the ballast chamber of each respective flotation ballast via a respective at least one air line having a proximate end coupled by a valve to said compressed gas source and a distal end coupled to at least one air line inlet at each flotation ballast, the air line inlets on each flotation ballasts operable to allow the egress of the compressed gas from the ballast chambers, where there are no valves controlling the flow of the compressed gas at the distal end of said air line;
providing an aperture on the bottom of each of the two flotation ballasts, the aperture operable to allow the ingress and egress of a liquid ballast into and out of the ballast chamber: and
coupling a discharge pipe to a port of the intake equipment.

13. The method of claim 12, wherein the intake equipment comprises:
a screen; and
a check valve having a first end and a second end opposite the first open end,
the first end coupled to the screen, the discharge pipe coupled to the second end of the check valve.

14. The method of claim 13, further comprising the step of coupling a pump to the proximate end of the discharge pipe.

15. The method of claim 13, wherein the intake equipment comprises:
a screen;
a submersible pump having a first open end and second open end opposite to the first open end, the first open end coupled to the screen so as to filter material having a predetermined size from entering the submersible pump; and
a check valve having a first open end and second open end opposite thereto, the first open end of the check valve being coupled to the second open end of the submersible pump and the proximate end of the discharge pipe being coupled to the second open end of the check valve.

* * * * *